(12) United States Patent
Seo et al.

(10) Patent No.: US 9,967,892 B2
(45) Date of Patent: May 8, 2018

(54) RESOURCE ALLOCATION METHOD AND DEVICE FOR DEVICE-TO-DEVICE DIRECT COMMUNICATION IN WIRELESS COMMUNICATION SYSTEM

(71) Applicant: LG ELECTRONICS INC., Seoul (KR)

(72) Inventors: Hanbyul Seo, Seoul (KR); Byounghoon Kim, Seoul (KR); Myoungseob Kim, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days. days.

(21) Appl. No.: 15/112,957

(22) PCT Filed: Jan. 15, 2015

(86) PCT No.: PCT/KR2015/000427
§ 371 (c)(1),
(2) Date: Jul. 20, 2016

(87) PCT Pub. No.: WO2015/111875
PCT Pub. Date: Jul. 30, 2015

(65) Prior Publication Data
US 2016/0345337 A1 Nov. 24, 2016

Related U.S. Application Data

(60) Provisional application No. 61/931,682, filed on Jan. 26, 2014.

(51) Int. Cl.
*H04W 4/00* (2009.01)
*H04L 12/26* (2006.01)
(Continued)

(52) U.S. Cl.
CPC ......... *H04W 72/082* (2013.01); *H04W 8/005* (2013.01); *H04W 72/02* (2013.01); *H04W 88/02* (2013.01)

(58) Field of Classification Search
CPC .................................................. H04W 72/082
See application file for complete search history.

(56) References Cited

U.S. PATENT DOCUMENTS 6,163,680 A 12/2000 Bridle et al.
7,106,707 B1 * 9/2006 Strutt .................. H04W 72/082
370/329
(Continued)

FOREIGN PATENT DOCUMENTS

KR 10-2009-0035799 A 4/2009
WO WO 2010/125427 A1 11/2010
(Continued)

*Primary Examiner* — Gerald Smarth
(74) *Attorney, Agent, or Firm* — Birch, Stewart, Kolasch & Birch, LLP

(57) ABSTRACT

Disclosed is a method by which a transmission terminal transmits a signal by using device-to-device direct communication in a wireless communication system. Particularly, the method comprises the steps of: identifying each of a plurality of resource units as a clean unit or a dirty unit; selecting one of the clean units as a transmission resource if the number of clean units is a first threshold value or more; selecting, as the transmission resource, one among the one or more dirty units from which interference that is a second critical value or more is detected if the number of clean units is less than the first threshold value; and transmitting a device-to-device direct communication signal by using the selected transmission resource.

10 Claims, 11 Drawing Sheets

(51) Int. Cl.
*H04W 72/08* (2009.01)
*H04W 72/02* (2009.01)
*H04W 8/00* (2009.01)
*H04W 88/02* (2009.01)

(56) References Cited

U.S. PATENT DOCUMENTS

| | | | |
|---|---|---|---|
| 7,209,746 B1* | 4/2007 | Kirino | H04N 5/38 348/14.02 |
| 7,990,883 B2* | 8/2011 | Nishikawa | H04W 84/18 370/252 |
| 8,885,507 B2* | 11/2014 | Chen | H04W 72/0406 370/252 |
| 2010/0261480 A1 | 10/2010 | Cho et al. | |
| 2013/0078991 A1 | 3/2013 | Nam | |
| 2013/0252621 A1 | 9/2013 | Dimou et al. | |
| 2014/0057670 A1 | 2/2014 | Lim et al. | |
| 2014/0112158 A1* | 4/2014 | Tavildar | H04B 7/15542 370/246 |
| 2014/0127991 A1 | 5/2014 | Lim et al. | |
| 2014/0160966 A1* | 6/2014 | Kang | H04W 72/1205 370/252 |
| 2016/0014831 A1 | 1/2016 | Lee et al. | |

FOREIGN PATENT DOCUMENTS

| | | |
|---|---|---|
| WO | WO 2011/037413 A2 | 3/2011 |
| WO | WO 2012/150815 A2 | 11/2012 |
| WO | WO 2012/159270 A1 | 11/2012 |
| WO | WO 2012/177002 A2 | 12/2012 |
| WO | WO 2013/119094 A1 | 8/2013 |

\* cited by examiner

FIG. 2
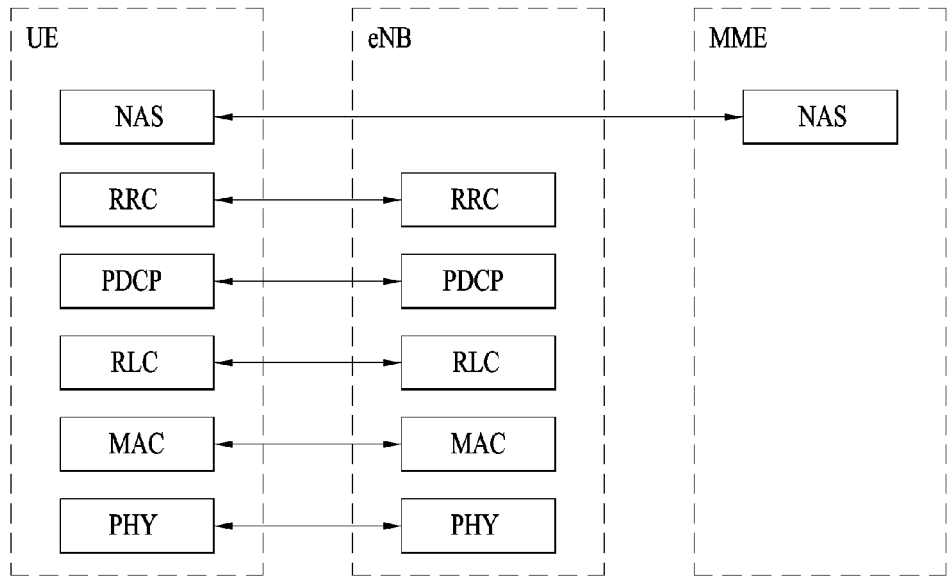
(a) control plane protocol stack
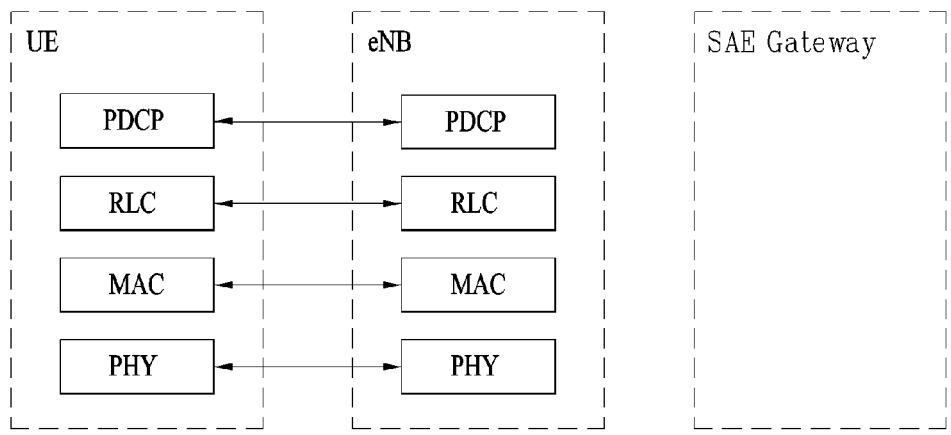
(b) user plane protocol stack

RESOURCE ALLOCATION METHOD AND DEVICE FOR DEVICE-TO-DEVICE DIRECT COMMUNICATION IN WIRELESS COMMUNICATION SYSTEM

CROSS REFERENCE TO RELATED APPLICATIONS

This application is the National Phase of PCT International Application No. PCT/KR2015/000427, filed on Jan. 15, 2015, which claims priority under 35 U.S.C. 119(e) to U.S. Provisional Application No. 61/931,682, filed on Jan. 26, 2014, all of which are hereby expressly incorporated by reference into the present application.

TECHNICAL FIELD

The present invention relates to a wireless communication system, and more particularly, to a method of allocating a resource for device-to-device communication in a wireless communication system and an apparatus therefor.

BACKGROUND ART

A structure of a 3GPP LTE (3rd Generation Partnership Project Long Term Evolution; hereinafter, referred as "LTE") system which is an example of a wireless communication system to which the present invention may be applied will be described.

FIG. 1 illustrates a schematic structure a network structure of an evolved universal mobile telecommunication system (E-UMTS). An E-UMTS system is an evolved version of the UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist for one BS. The cell provides a downlink or uplink transmission service to several UEs using any one of bandwidths of 1.25, 2.5, 5, 10, 15 and 20 MHz. Different cells may be set to provide different bandwidths. A BS controls data transmission or reception to or from a plurality of UEs. The BS transmits downlink scheduling information to a UE with respect to downlink (DL) data so as to inform the UE of time/frequency domain, coding, data size, Hybrid Automatic Repeat and reQuest (HARQ) associated information of data to be transmitted, or the like. The BS transmits uplink scheduling information to a UE with respect to uplink (UL) data so as to inform the UE of time/frequency domain, coding, data size, HARQ associated information used by the UE, or the like. An interface for transmitting user traffic or control traffic can be used between BSs. A Core Network (CN) may include the AG, a network node for user registration of the UE, or the like. The AG manages mobility of a UE on a Tracking Area (TA) basis. One TA includes a plurality of cells.

Wireless communication technology has been developed to reach the LTE based on Wideband Code Division Multiple Access (WCDMA), but demands and expectations of users and providers have continuously increased. In addition, since other aspects of wireless access technology continue to evolve, new advances are required to remain competitive in the future. There is a need for reduction in cost per bit, service availability increase, the use of a flexible frequency band, a simple structure and an open type interface, appropriate power consumption of a UE, etc.

DISCLOSURE OF THE INVENTION

Technical Task

Based on the aforementioned discussion, the present invention intends to provide a method of allocating a resource for direct communication between terminals in a wireless communication system and an apparatus therefor in the following.

Technical Solution

To achieve these and other advantages and in accordance with the purpose of the present invention, as embodied and broadly described, according to one embodiment, a method of transmitting a signal, which is transmitted by a user equipment using device-to-device (D2D) communication in a wireless communication system, includes the steps of classifying each of a plurality of resource units into clean units or dirty units, if the number of the clean units is equal to or greater than a first threshold, selecting one of the clean units as a transmission resource, if the number of the clean units is less than the first threshold, selecting a dirty unit from among one or more dirty units at which interference equal to or greater than a second threshold is detected as the transmission resource, and transmitting a D2D signal using the selected transmission resource.

Preferably, the step of selecting a dirty unit from among the one or more dirty units as the transmission resource can include the step of selecting a dirty unit from among dirty units equal to or less than a third threshold among the one or more dirty units as the transmission resource.

And, the classifying step can include the step of classifying each of a plurality of the resource units into the clean units or the dirty units according to an MCS (modulation and coding scheme) level for transmitting the signal. In this case, the number of resource units classified as the clean units increases as the MCS level increases.

More preferably, the step of classifying each of a plurality of the resource units into the clean units or the dirty units can further include the steps of receiving information on a preferred resource unit from a counterpart user equipment and classifying a plurality of the resource units into the clean units or the dirty units based on the information on the preferred resource unit.

To further achieve these and other advantages and in accordance with the purpose of the present invention, according to a different embodiment, a user equipment performing device-to-device (D2D) communication in a wireless communication system includes a wireless communication module configured to transceive a signal with a base station or a counterpart user equipment of the D2D communication and a processor configured to process the signal, the processor configured to classify each of a plurality of resource units into clean units or dirty units, the processor, if the number of the clean units is equal to or greater than a first threshold, configured to select one of the clean units as a transmission resource, the processor, if the number of the clean units is less than the first threshold, configured to select a dirty unit from among one or more dirty units at which interference equal to or greater than a second threshold is detected as the transmission resource, the processor configured to control the wireless communication module to transmit a D2D signal using the selected transmission resource.

Preferably, if a dirty unit is selected from among the one or more dirty units, the processor can select a dirty unit from among dirty units equal to or less than a third threshold among the one or more dirty units as the transmission resource.

And, the processor can classify each of a plurality of the resource units into the clean units or the dirty units according to an MCS (modulation and coding scheme) level for transmitting the signal. In this case, the number of resource units classified as the clean units increases as the MCS level increases.

More preferably, the processor can classify a plurality of the resource units into the clean units or the dirty units based on information on a preferred resource unit received from a counterpart user equipment.

In the aforementioned embodiments, a first threshold for a case that transmission of the D2D communication signal corresponds to initial transmission is less than a first threshold for a case that the transmission of the D2D communication signal corresponds to retransmission.

Advantageous Effects

According to embodiments of the present invention, it is able to efficiently allocate a resource for direct communication between terminals and it is efficiently transmit and receive a signal.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram for structures of control and user planes of radio interface protocol between a 3GPP radio access network standard-based user equipment and E-UTRAN;

BEST MODE

Mode for Invention

Figure 1:
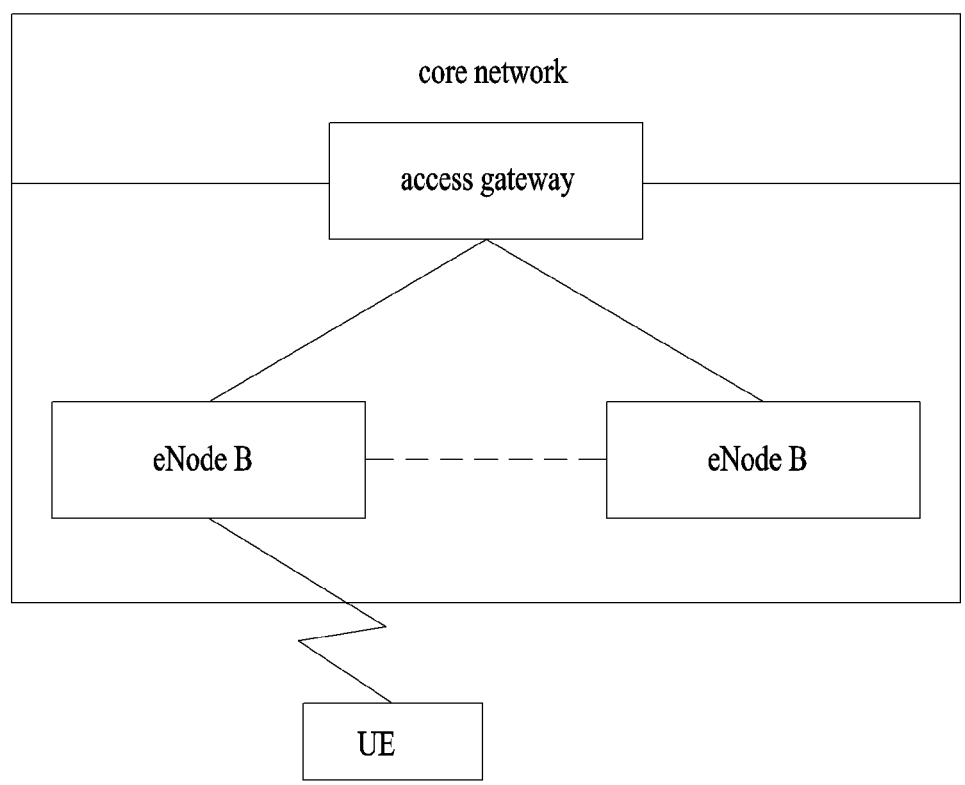
FIG. 1 is a schematic diagram of E-UMTS network structure as one example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

And, in the present specification, a base station can be named by such a comprehensive terminology as an RRH (remote radio head), an eNB, a TP (transmission point), an RP (reception point), a relay and the like.

FIG. 2 is a diagram showing the structure of a control plane and a user plane of a radio interface protocol between a UE and an E-UTRAN based on the 3GPP radio access network standard. The control plane refers to a path through which control messages used for managing a call by the UE and the E-UTRAN are transmitted. The user plane refers to a path through which data generated at an application layer, for example, voice data, Internet packet data or the like is transmitted.

The physical layer, which is the first layer, provides an information transfer service to a higher layer using a physical channel. The physical layer is connected with a medium access control (MAC) layer located at a higher level through a transport channel, and data is transferred between the MAC layer and the physical layer via the transport channel. Data is transferred between physical layers of a transmission side and a reception side via the physical channel. The physical channel uses time and frequency as radio resources. In detail, the physical channel is modulated using an Orthogonal Frequency Division Multiple Access (OFDMA) scheme in downlink and is modulated using a Single Carrier Frequency Division Multiple Access (SC-FDMA) scheme in uplink.

The MAC layer of the second layer provides services to a radio link control (RLC) layer, which is a higher layer, via a logical channel. The RLC layer of the second layer enables reliable data transmission. The function of the RLC layer is included as the functional block of the MAC layer. A Packet Data Convergence Protocol (PDCP) layer of the second layer performs a header compression function that reduces the size of an Internet protocol (IP) packet header containing unnecessary control information having a relatively large size in order to efficiently transmit the IP packets such as IPv4 or IPv6 packets over a radio interface having a limited bandwidth.

Radio Resource Control (RRC) located at a lowest portion of the third layer is defined only in the control plane. The RRC layer handles logical channels, transport channels and physical channels for the configuration, re-configuration and release of Radio Bearers (RBs). Here, the RBs refer to services provided by the second layer, for data transfer between the UE and the network. The RRC layers of the UE and the network exchange RRC messages with each other. If the RRC layers of the UE and the network are RRC-connected, the UE is in an RRC connected mode and, if so not, is in an RRC idle mode. A Non-Access Stratum (NAS) layer located at a layer higher than the RRC layer performs a function such as session management and mobility management.

One cell configuring a base station (eNB) provides a downlink or uplink transmission service to several UEs using any one of bandwidths of 1.25, 2.5, 5, 10, 15 and 20 MHz. Different cells may be set to provide different bandwidths.

Examples of a downlink transport channel for transmitting data from the network to the UE include a Broadcast Channel (BCH) for transmitting system information, a Paging Channel (PCH) for transmitting a paging message, or a downlink Shared Channel (SCH) for transmitting user traffic or a control message. Traffic or a control message of a broadcast service or downlink multicast may be transmitted through the downlink SCH or a separate downlink Multicast Channel (MCH). Examples of an uplink transport channel for transmitting data from the UE to the network include a Random Access Channel (RACH) for transmitting an initial control message and an uplink SCH for transmitting user traffic or a control message. Examples of a logical channel located at a layer above the transport channel and mapped to the transport channel includes a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
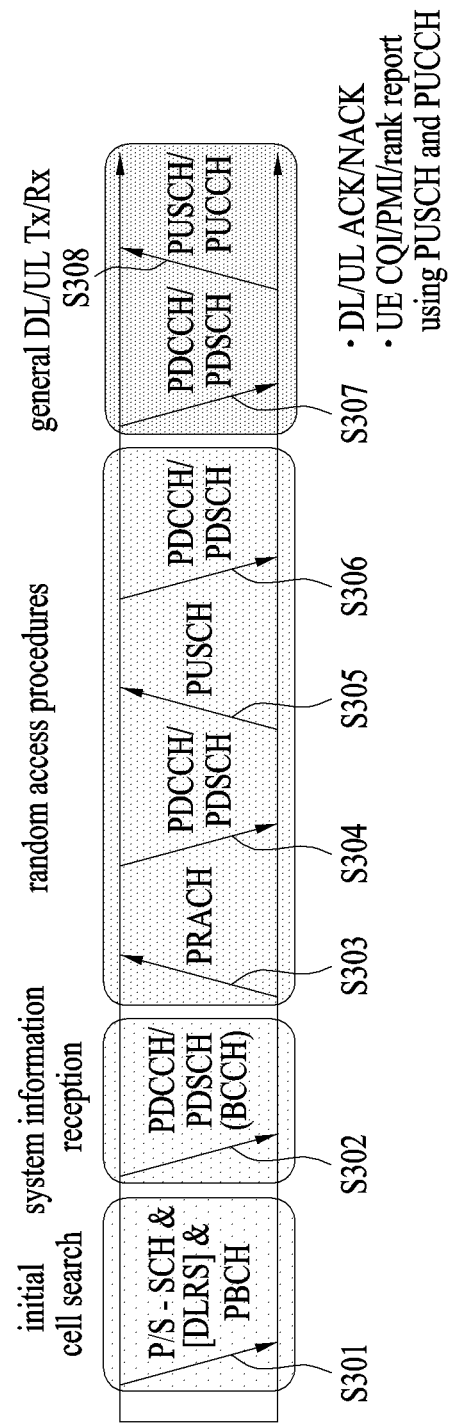
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
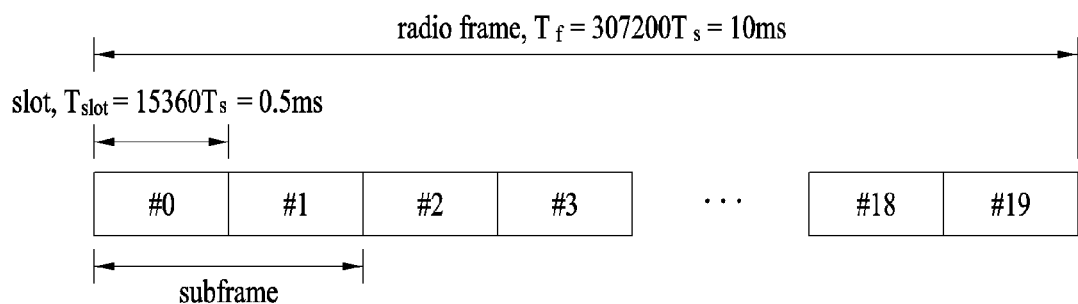
FIG. 4 is a diagram for a structure of a radio frame in LTE system.

FIG. 4 is a diagram for a structure of a radio frame in LTE system.

Referring to FIG. 4, one radio frame has a length of 10 ms ($327,200 \times T_S$) and is constructed with 10 subframes in equal size. Each of the subframes has a length of 1 ms and is constructed with two slots. Each of the slots has a length of 0.5 ms ($15,360 \times T_S$). In this case, $T_s$ indicates a sampling time and is represented as $T_s=1/(15\ kHz \times 2048)=3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
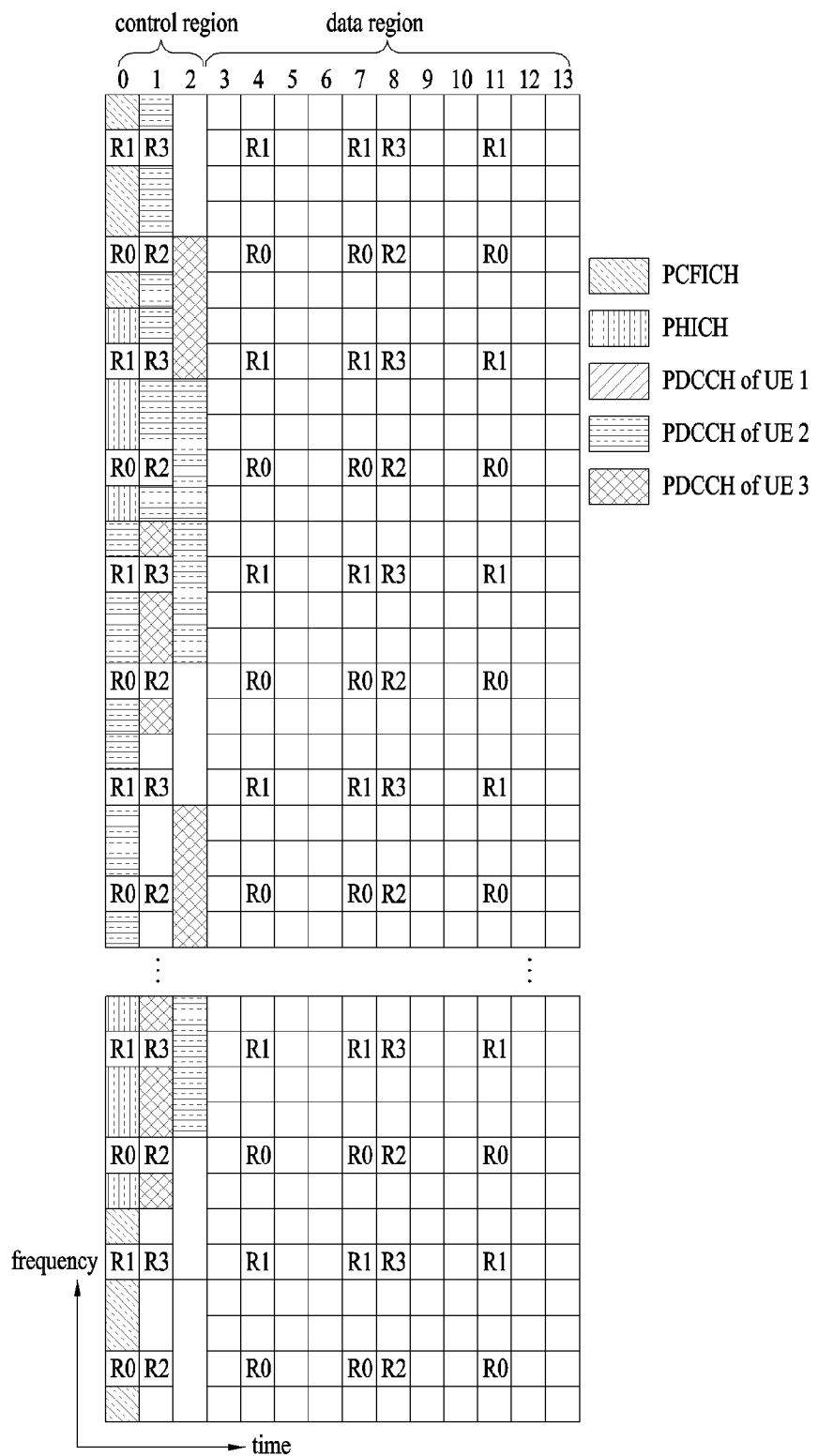
FIG. 5 is a diagram for a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS) or a pilot signal for an antenna 0 to 3. The RS is fixed as a constant pattern in the subframe irrespective of the control region and the data region. The control channel is assigned to a resource to which the RS is not assigned in the control region and a traffic channel is also assigned to a resource to which the RS is not assigned in the data region. The control channel assigned to the control region may include a physical control format indicator channel (PCFICH), a physical hybrid-ARQ indicator channel (PHICH), a physical downlink control channel (PDCCH), and the like.

The PCFICH (physical control format indicator channel) informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH (physical HARQ (hybrid-automatic repeat and request) indicator channel) is used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH (physical DL control channel) is assigned to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on a user equipment (one or a plurality of user equipments) receiving data of PDSCH, a method of receiving and decoding the PDSCH data performed by the user equipment, and the like is transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transport block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 6:
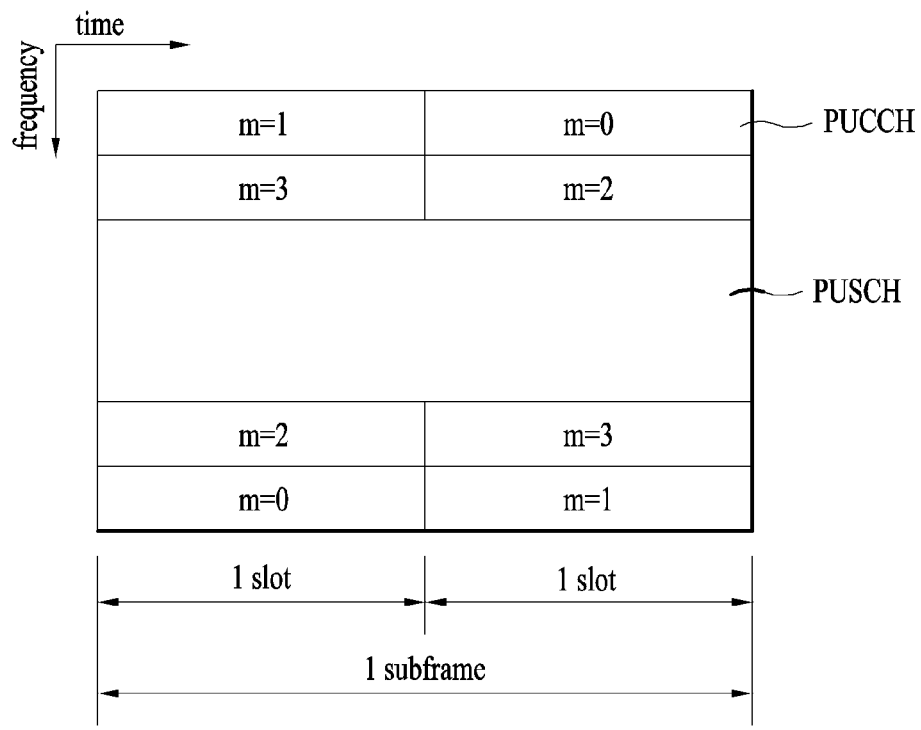
FIG. 6 is a diagram for a structure of an uplink subframe frame in LTE system.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 6 shows an example that the PUCCHs satisfying conditions (e.g., m=0, 1, 2, 3) are assigned to a subframe.

Figure 7:
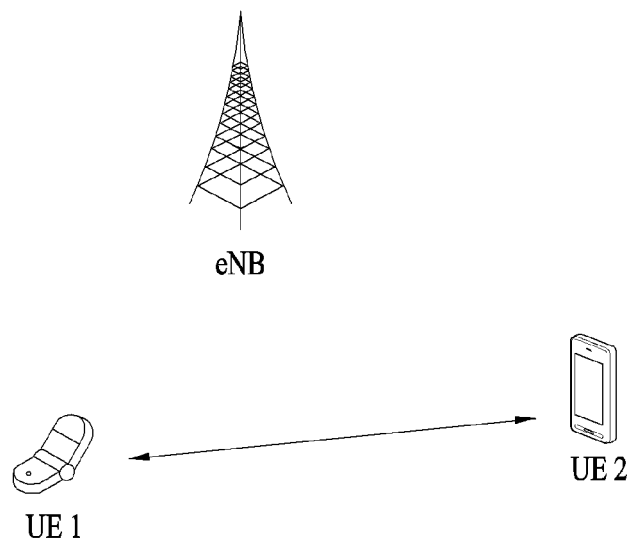
FIG. 7 is a conceptual diagram for device-to-device direct communication.

FIG. 7 is a conceptual diagram for device-to-device direct communication.

Referring to FIG. 7, in a D2D (device-to-device) communication that a UE performs direct wireless communication with a different UE, an eNB can transmit a scheduling message for indicating D2D transmission and reception in the device-to-device direct communication. A UE participating in the D2D communication receives a D2D scheduling message from the eNB and performs a transmission and reception operation indicated by the D2D scheduling message. In this case, although the UE indicates a terminal of a user, if such a network entity as an eNB transmits or receives a signal according to a communication scheme between UEs, the network entity can be regarded as a sort of UEs. In the following, a link directly linked between UEs and a link for communicating between a UE and an eNB are referred to as a D2D link and an NU link, respectively.

In order to perform a D2D operation, a UE preferentially performs a discovery procedure to identify whether a counterpart UE with which D2D communication is to be performed is located at a near region where the D2D communication is available. The discovery procedure is performed in a manner that a UE transmits a unique discovery signal capable of recognizing the UE and a neighbor UE detects the discovery signal and identifies that the UE, which has transmitted the discovery signal, is located at a near position. In particular, each UE checks that a counterpart UE with which D2D communication is to be performed is located at a near position via the discovery procedure and performs D2D communication for transmitting and receiving practical user data with the counterpart UE.

Meanwhile, a case that a UE1 selects a resource unit corresponding to a specific resource from a resource pool corresponding to a set of resources and transmits a D2D signal using the selected resource unit is explained in the following. In this case, if the UE1 is located within coverage of an eNB, the eNB can inform the UE1 of the resource pool. If the UE1 is located at the outside of the coverage of the eNB, a different UE may inform the UE1 of the resource pool or the resource pool can be determined by predetermined resources. In general, the resource pool includes a plurality of resource units. Each UE selects one or more resource units and may be then able to use the selected resource unit(s) to transmit a D2D signal of the UE.

Figure 8:
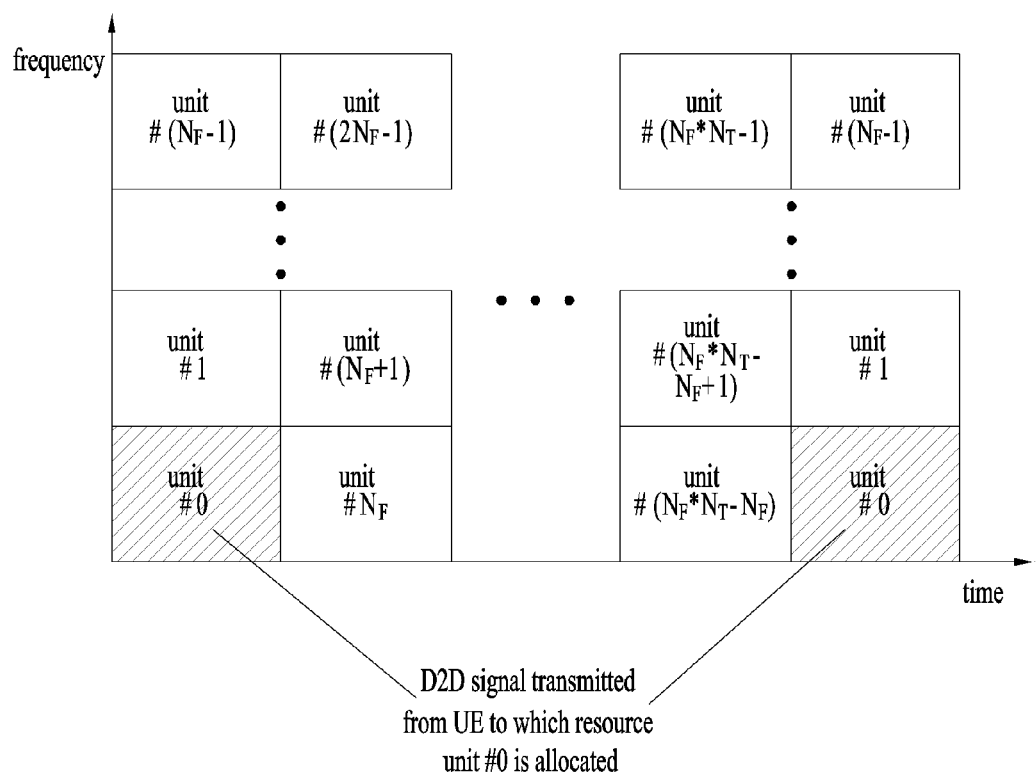
FIG. 8 is a diagram for configuration examples of a resource pool and a resource unit.

FIG. 8 is a diagram for configuration examples of a resource pool and a resource unit.

Referring to FIG. 8, it exemplary shows a case of defining $N_F * N_T$ number of resource units in total by dividing total frequency resources into $N_F$ and dividing total time resources into $N_T$. In particular, it shows that a corresponding resource pool is repeated with an interval of $N_T$ subframes. Particularly, one resource unit may periodically and repeatedly appears. Or, an index of a physical resource unit to which one logical resource unit is mapped may change in a predetermined pattern to obtain a diversity effect in time domain or frequency domain. In this resource unit structure, the resource pool may correspond to a set of resource units capable of being used for a UE to transmit a D2D signal.

In the following description, a principle of selecting a D2D resource proposed in the present invention is explained. In particular, in the present invention, assume a case that a UE scans communication status of other UEs in a resource unit belonging to a resource pool and selects a resource. In this case, the UE can identify interference status generated by other UEs in each resource unit. The interference status can be identified by detecting signals which are known in advance and transmitted by other UEs, e.g., a DM-RS (demodulation reference signal) and checking reception power of the signals. Or, it may consider the sum of energy of all signals detected in a resource unit as interference status of the resource unit. In order to explain the present invention, status of a resource unit described in the following is defined.

If interference status identified in a specific resource unit is equal to or less than a prescribed level, for example, if energy detected in the resource unit is equal to or less than a given reference value, it is determined as the resource unit has no link used in a mutual interference relation. This is referred to as a clean unit.

If interference status identified in a specific resource unit is equal to or greater than a prescribed level, the resource unit is referred to as a dirty unit. In the dirty unit, one of UEs performs D2D within a range affecting with each other. As a detected interference level is lower, it can be determined as a UE located at far is used for transmission.

Based on the definitions above, the present invention proposes three principles described in the following as a basic principle of resource allocation for D2D. Yet, although there exists a prescribed time interval between timing of identifying interference status and timing of practically allocating a resource, assume that an identical resource is used during the prescribed time interval in general.

Principle 1) If the sufficient number of clean units exist, it may be preferable to separate resources used by each transmission UE from each other using the clean units and prevent mutual interference from the start.

Principle 2) When a specific UE receives a D2D signal, if the UE receives the D2D signal using a clean unit, it is a best scenario. If the UE receives a D2D signal using a dirty unit, it may be profitable when an interference level is relatively low. This is because, in the aspect of reception, interference examined by a corresponding UE exactly corresponds to interference affecting reception performance.

Figure 9:
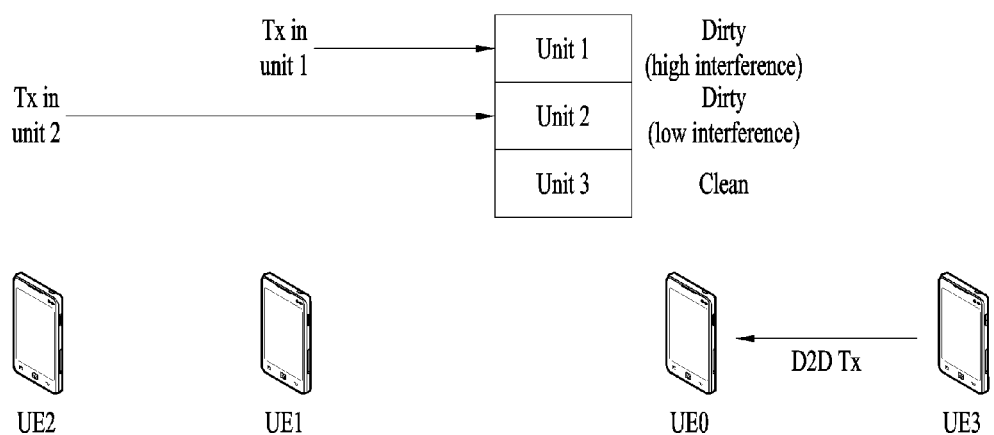
FIG. 9 is a diagram for an example of allocating a resource to receive a D2D signal according to embodiment of the present invention.

FIG. 9 is a diagram for an example of allocating a resource to receive a D2D signal according to embodiment of the present invention. In particular, in FIG. 9, assume that a UE receiving a D2D signal corresponds to a UE0.

Referring to FIG. 9, when statuses of a resource unit 1, a resource unit 2, and a resource unit 3 are identified as FIG. 9, if a UE3 corresponding to a new transmission UE selects the resource unit 3 corresponding to a clean resource, it is able to optimize reception performance in the aspect of the UE0. In case of using a dirty unit, it may be preferable to use a resource unit 2 that interference is relatively low.

Principle 3) When a specific UE transmits a D2D signal, if the UE uses a dirty unit, it may be preferable to use a resource unit of which an interference level is relatively high. Regarding this, it shall be described in more detail in the following.

A. Although a UE adjacent to a transmission UE experiences high interference similar to interference examined by the transmission UE in a corresponding resource unit, since signal power delivered from the transmission UE is high, the UE can overcome the high interference. This is explained with reference to the attached drawing.

Figure 10:
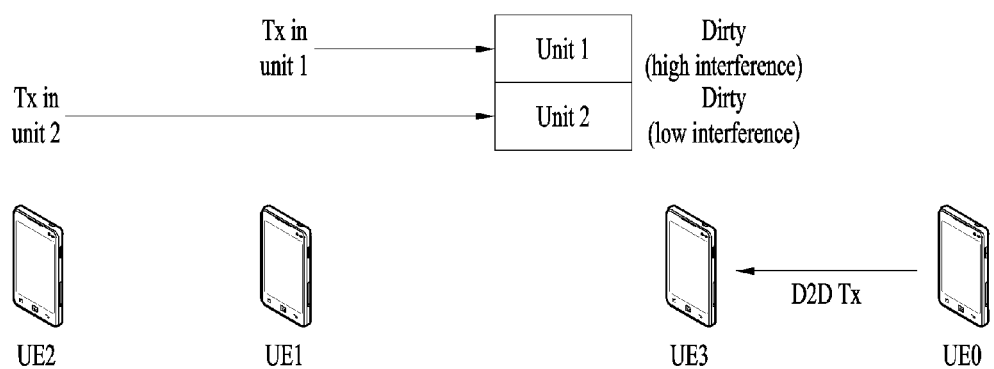
FIG. 10 is a diagram for an example of allocating a resource to transmit a D2D signal according to embodiment of the present invention.

FIG. 10 is a diagram for an example of allocating a resource to transmit a D2D signal according to embodiment of the present invention. FIG. 10 exemplary shows a case that a UE0 transmits a signal when a UE1 and a UE2 perform transmission in a resource unit 1 and a resource unit 2, respectively. In this case, in the aspect of the UE3 adjacent to the UE0, although interference of the resource unit 1 is higher, the UE3 can easily overcome the interference because distance from the UE0 is short.

B. If a transmission UE does not use a resource unit of which interference is low, a reception UE examining low interference similar to the transmission UE can use the resource unit for receiving a D2D signal.

In particular, since it is probable that a dirty unit of which an interference level is low is to be used for transmitting a D2D signal of a UE positioned at relatively far, if a specific UE uses the resource unit to transmit a D2D signal, it works as strong interference to reception of other UEs adjacent to the specific UE. Referring back to FIG. 10, if the UE0 transmits a signal using the resource unit 2 of which an interference level is low, performance of the UE3 adjacent to the UE0 for receiving a signal of the UE2 far from the UE3 is considerably deteriorated. Hence, it may be preferable that the UE0 transmits a signal using the resource unit 1 of which an interference level is low.

In the following, methods of performing resource allocation in a manner of applying the aforementioned principles are explained.

First of all, a method for a transmission UE to select a resource based on interference measured for each resource unit without exchanging a separate signal between UEs is explained.

Figure 11:
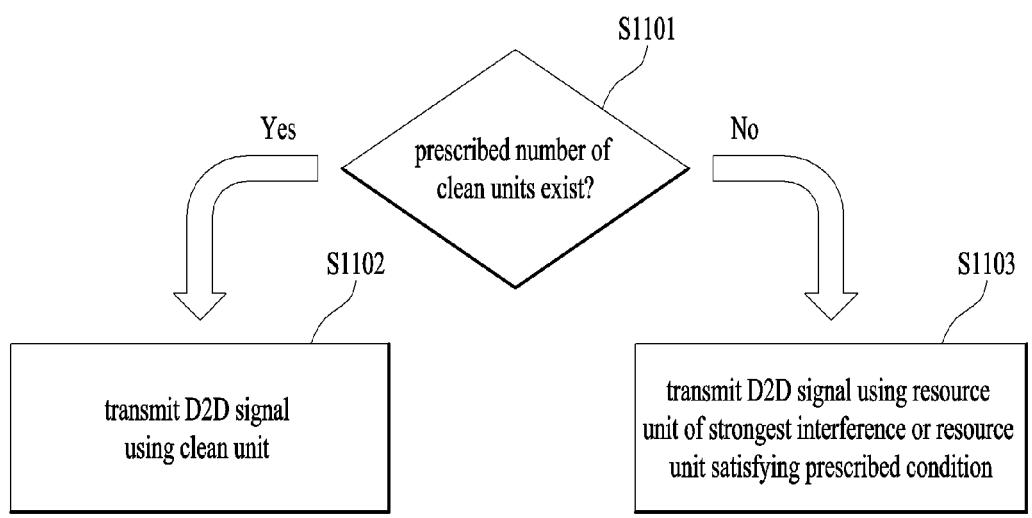
FIG. 11 is a flowchart for an example of selecting a resource for D2D communication according to embodiment of the present invention.

FIG. 11 is a flowchart for an example of selecting a resource for D2D communication according to embodiment of the present invention.

Referring to FIG. 11, in the step S1101, the aforementioned principle 1 is performed, i.e., whether or not a clean unit exists more than a prescribed level is determined. If exists, a signal is transmitted to one of clean resources in the step S1102.

If a condition of the principle 1 is not satisfied, it is necessary for a transmission UE to select one of dirty units in the step S1103. In this case, the transmission UE is able to select a resource unit of strongest interference according to the principle 3. Yet, in this case, a case that a plurality of UEs continuously select an identical resource may occur. In order to mitigate the case, the transmission UE may consider additional conditions described in the following.

a. It is able to randomly select one of resource units at which an interference level of top x % is detected.

b. Or, it is able to randomly select one of dirty units at which interference equal to or stronger than a prescribed level appears. For example, if an interference level is configured to be identical to a reference for determining whether a resource unit corresponds to a clean unit or a dirty unit, it is able to randomly select one of dirty units.

c. Or, it may be able to prevent a dirty unit at which excessively high interference is detected from being selected by assuming that too many transmission UEs are concentrated on the dirty unit. As an example, it is able to prevent a dirty unit of which an interference level is equal to or stronger than a prescribed level from being selected or the dirty unit may have low priority in selection.

Figure 12:
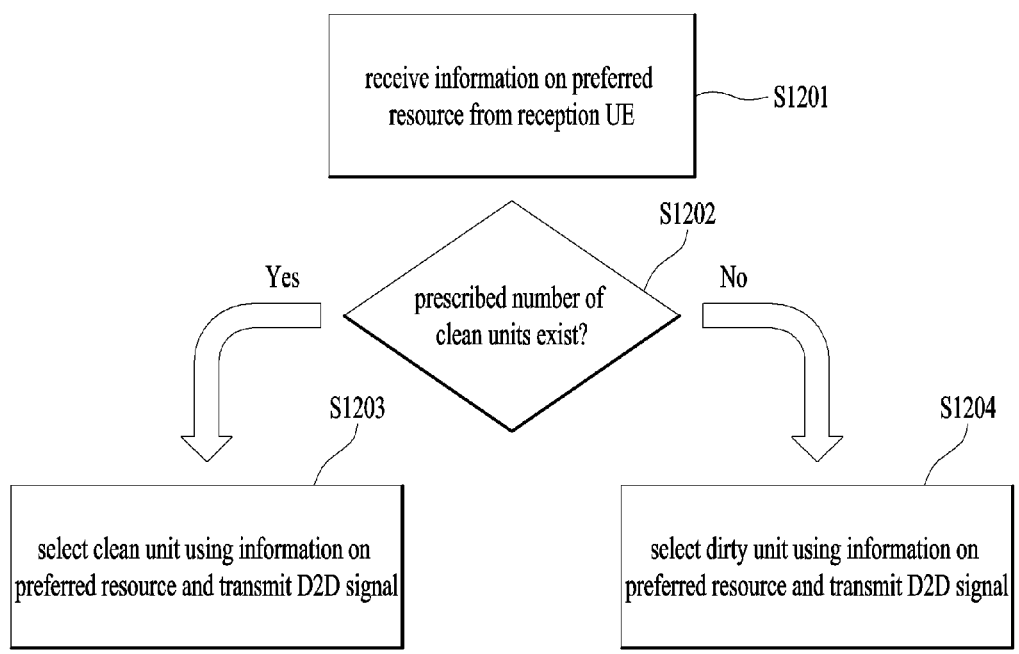
FIG. 12 is a flowchart for a different example of selecting a resource for D2D communication according to embodiment of the present invention.

Subsequently, a method of performing resource allocation by exchanging a prescribed signal between UEs is explained in the following. FIG. 12 is a flowchart for a different example of selecting a resource for D2D communication according to embodiment of the present invention.

Referring to FIG. 12, a UE informs a different UE of a resource preferred by the UE according to the second principle in the step S1201. In particular, a UE transmitting a D2D signal receives information on a resource preferred by the UE from a different UE.

In this procedure, since the information transmitted by the UE may target a plurality of unspecified transmission UEs, it may use a structure of a discovery signal corresponding to a signal that informs whether or not a UE exists. Specifically, each UE can notify a location of a clean unit examined from the view of the UE or a location of a dirty unit of which interference is low. Or, the UE may be able to notify a location of a resource, which is difficult to receive because very strong interference is examined, among dirty units.

The UE transmitting a D2D signal selects a resource unit for transmitting a D2D signal by utilizing the information received in the step S1201. Specifically, in the step S1202, the UE determines whether or not a clean unit examined in the UE exists more than a prescribed level according to the principle 1.

If exists, as shown in the step S1203, the UE transmits a signal by selecting a resource, which appears as a clean unit (or a dirty unit of low interference) to the UE, among resources declared as a clean unit (or a dirty unit of low interference) by other UEs via the preferred info, illation in the step S1201. In case of transmitting a D2D signal to a plurality of reception UEs, it may consider a resource commonly declared as a clean unit (or a dirty unit of low interference) by UEs belonging to a plurality of the reception UEs.

However, if a clean unit does not satisfy a prescribed level, as shown in the step S1204, the UE transmits a signal by selecting a dirty unit appearing as strong interference to the UE from among resources declared as a clean unit (or a dirty unit of low interference) by other UEs via the preferred information in the step S1201. In case of transmitting a signal to a plurality of reception UEs, it may consider a resource commonly declared as a clean unit (or a dirty unit of low interference) by UEs belonging to a plurality of the reception UEs. In this case, since a case of continuously selecting an identical resource by a plurality of UEs may occur, in order to mitigate the case, a transmission UE may consider the aforementioned additional conditions a to c.

Meanwhile, in a series of the aforementioned methods, it is necessary to define a concept that the number of clean units is equal to or greater than a prescribed level in more detail. In this case, a case that at least one or more clean units exist, a case that clean units exist more than a predetermined number, or a case that a ratio of clean units occupying a resource pool is equal to or greater than a predetermined value, and the like may correspond to the concept.

Meanwhile, in the aforementioned operations, a reference for determining whether a resource unit is clean or dirty can be determined by a plurality of D2D transmission and reception parameters. More specifically, when a specific resource is clean, it may indicate that a different D2D transmission UE does not exist within a range considered by the resource unit. And, a D2D transmission range can be determined by a transmission and reception parameter. Examples of the parameter include transmit power, MCS (modulation and coding scheme) in use, a transmission bandwidth, and the like.

For example, in case of the MCS, if a transmission UE uses a higher MCS, it may indicate that a range of a D2D link is relatively short. This is because it is necessary to have a reception signal of higher quality to decode the higher MCS. Hence, in the aspect of the UE using the higher MCS, the UE may increase an interference reference for determining whether a resource unit is clean or dirty to consider a part that a range is shortened. As a result, a UE intending to use the higher MCS may regard the more number of resource units as a clean unit. As a result, it is able to see a trend that a case of using the higher MCS increases compared to a case of using lower MCS of which the number of clean units is less. This may be matched with a phenomenon that a probability of exiting of a transmission UE within a range decreases as the range is getting short. Similarly, if transmit power is weak or a bandwidth is wide, a range becomes short as well. Hence, it may increase a reference for determining whether a resource unit is clean or dirty.

Additionally, as a different example of the D2D transmission and reception parameter, there is a parameter for indicating whether transmission corresponds to initial transmission for given information or retransmission for previously transmitted information. As an example, it may change a reference for identifying a clean unit or a dirty unit according to the initial transmission and the retransmission. In particular, in case of the initial transmission, it may be able to increase a reference interference level for determining whether a resource unit is clean or not and select a resource less interfered by interference to enable a UE located at far to receive a signal. On the contrary, in case of the retransmission, it may be able to decrease a reference interference level for determining whether a resource unit is clean or not and regulate a resource of strong interference to be used. This is because, although interference is strong in a corresponding resource unit, it is able to successfully finish reception in a manner of combining the resource unit with previously transmitted information.

Similar to this, definition on the sufficient number of clean units can also be changed. In case of attempting to perform initial transmission, it may be able to configure a reference for the sufficient number of clean units to be small. Hence, if there is a clean unit, a transmission UE uses the clean unit. On the contrary, in case of performing retransmission, the reference for the sufficient number of clean units can be configured to be big. Hence, although there are some clean units, it may be able to induce the transmission UE to use a dirty unit.

In addition, if a reception UE is able to deliver a feedback on whether or not reception is successfully finished, it is able to control a resource selection criterion of a transmission UE based on the feedback. As an example, when the feedback on the successful reception (more than a prescribed rate during prescribed time) is received from the reception UE, if a resource in use corresponds to a clean unit under a determination that the transmission UE continuously maintains the currently used resource or the transmission UE has selected a resource of excessively good quality, it may be able to make the transmission UE use a dirty unit instead of the clean unit. On the contrary, if the transmission UE receives a feedback on a reception failure (more than a prescribed rate during prescribed time) from the reception UE, the transmission UE may perform an operation of changing to a dirty unit of which an interference level is lower or a clean unit.

Figure 13:
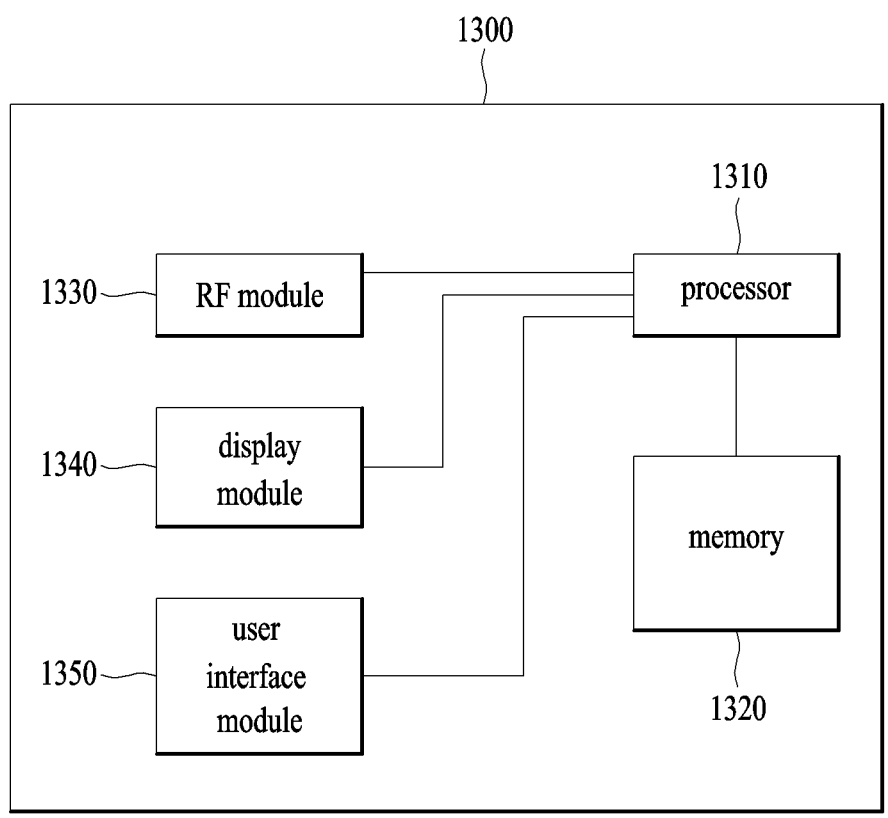
FIG. 13 is a block diagram for a communication device according to one embodiment of the present invention.

FIG. 13 is a block diagram for an example of a communication device according to one embodiment of the present invention.

Referring to FIG. 13, a communication device 1300 may include a processor 1310, a memory 1320, an RF module 1330, a display module 1340, and a user interface module 1350.

Since the communication device 1300 is depicted for clarity of description, prescribed module(s) may be omitted in part. The communication device 1300 may further include necessary module(s). And, a prescribed module of the communication device 1300 may be divided into subdivided modules. A processor 1310 is configured to perform an operation according to the embodiments of the present invention illustrated with reference to drawings. In particular, the detailed operation of the processor 1310 may refer to the former contents described with reference to FIG. 1 to FIG. 12.

The memory 1320 is connected with the processor 1310 and stores an operating system, applications, program codes, data, and the like. The RF module 1330 is connected with the processor 1310 and then performs a function of converting a baseband signal to a radio signal or a function of converting a radio signal to a baseband signal. To this end, the RF module 1330 performs an analog conversion, amplification, a filtering, and a frequency up conversion, or performs processes inverse to the former processes. The display module 1340 is connected with the processor 1310 and displays various kinds of informations. And, the display module 1340 can be implemented using such a well-known component as an LCD (liquid crystal display), an LED (light emitting diode), an OLED (organic light emitting diode) display and the like, by which the present invention may be non-limited. The user interface module 1350 is connected with the processor 1310 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of allocating a resource for device-to-device communication in a wireless communication system and an apparatus therefor are described with reference to examples applied to 3GPP LTE system, it may be applicable to various kinds of wireless communication systems as well as the 3GPP LTE system.

What is claimed is:

1. A method of transmitting a signal, which is transmitted by a user equipment using device-to-device (D2D) communication in a wireless communication system, the method comprising:
classifying each of a plurality of resource units into clean units or dirty units;
when a number of the clean units is equal to or greater than a first threshold, selecting one of the clean units as a transmission resource;
when the number of the clean units is less than the first threshold, selecting a dirty unit as the transmission resource among one or more dirty units,
wherein the one or more dirty units correspond to a resource unit in which interference equal to or greater than a second threshold among the classified dirty units is detected; and
transmitting a D2D signal using the selected transmission resource.

2. The method of claim 1, wherein the selecting the dirty unit as the transmission resource among the one or more dirty units comprises selecting a dirty unit as the transmission resource among dirty units equal to or less than a third threshold among the one or more dirty units.

3. The method of claim 1, wherein each of the plurality of the resource units is classified into the clean units or the dirty units according to a modulation and coding scheme (MCS) level for transmitting the D2D signal,
wherein a number of resource units classified as the clean units increases as the MCS level increases.

4. The method of claim 1, wherein the first threshold for a case where the transmission of the D2D signal corresponds to an initial transmission is less than the first threshold for a case where the transmission of the D2D signal corresponds to a retransmission.

5. The method of claim 1, wherein the classifying each of the plurality of the resource units into the clean units or the dirty units further comprises:
   receiving information on a preferred resource unit from a counterpart user equipment; and
   classifying a plurality of the resource units into the clean units or the dirty units based on the information on the preferred resource unit.

6. A user equipment performing device-to-device (D2D) communication in a wireless communication system, the user equipment comprising:
   a transceiver; and
   a processor connected with the transceiver, that:
      classifies each of a plurality of resource units into clean units or dirty units,
      when a number of the clean units is equal to or greater than a first threshold, selects one of the clean units as a transmission resource,
      when the number of the clean units is less than the first threshold, selects a dirty unit as the transmission resource among one or more dirty units,
      wherein the one or more dirty units correspond to a resource unit in which interference equal to or greater than a second threshold among the classified dirty units is detected, and
      controls the transceiver to transmit a D2D signal using the selected transmission resource.

7. The user equipment of claim 6, wherein, when the dirty unit is selected among the one or more dirty units, the processor is configured to select a dirty unit as the transmission resource among dirty units equal to or less than a third threshold among the one or more dirty units.

8. The user equipment of claim 6, wherein the processor is configured to classify each of the plurality of the resource units into the clean units or the dirty units according to a modulation and coding scheme (MCS) level for transmitting the D2D signal,
   wherein a number of resource units classified as the clean units increases as the MCS level increases.

9. The user equipment of claim 6, wherein the first threshold for a case where the transmission of the D2D signal corresponds to an initial transmission is less than the first threshold for a case where the transmission of the D2D signal corresponds to a retransmission.

10. The user equipment of claim 6, wherein the processor is configured to classify a plurality of the resource units into the clean units or the dirty units based on information on a preferred resource unit received by the transceiver from a counterpart user equipment.

* * * * *